United States Patent [19]
Shih et al.

[11] Patent Number: 5,911,904
[45] Date of Patent: Jun. 15, 1999

[54] FOAMABLE INSULATING BARRIER COATING

[75] Inventors: Keith S. Shih, Harriman, N.Y.; Ashok M. Adur, Ramsey, N.J.; Charles J. Davis, Goshen, N.Y.

[73] Assignee: International Paper Company, Tuxedo Park, N.Y.

[21] Appl. No.: 08/991,642

[22] Filed: Dec. 16, 1997

[51] Int. Cl.[6] .............................. C08H 9/06; C08H 9/10
[52] U.S. Cl. ...................... 252/62; 106/122; 106/205.6; 106/427; 106/429; 521/65; 521/82; 521/89; 521/94
[58] Field of Search .......................... 426/323; 106/122, 106/425, 427, 429, 822, 205.6, 271; 524/100; 252/62; 220/458, 461; 521/65, 82, 89, 94

[56] References Cited

U.S. PATENT DOCUMENTS

| | | |
|---|---|---|
| 2,917,217 | 12/1959 | Sisson . |
| 3,037,652 | 6/1962 | Wallace . |
| 3,049,277 | 8/1962 | Shappell . |
| 3,237,834 | 3/1966 | Davis et al. . |
| 3,299,914 | 1/1967 | Harmon . |
| 3,333,515 | 8/1967 | McGlynn . |
| 3,589,592 | 6/1971 | Tigner ....................... 229/3.5 |
| 3,988,521 | 10/1976 | Fumei et al. .............. 428/35 |
| 4,016,126 | 4/1977 | Fumei et al. .............. 260/29.6 RB |
| 4,016,327 | 4/1977 | Fumei et al. .............. 428/314 |
| 4,094,685 | 6/1978 | Lester et al. ............... 521/76 |
| 4,288,026 | 9/1981 | Wilhelm .................... 229/403 |
| 4,571,360 | 2/1986 | Brown et al. .............. 427/391 |
| 4,613,650 | 9/1986 | Sekiya et al. .............. 524/828 |
| 5,298,542 | 3/1994 | Nakamura et al. ......... 524/297 |
| 5,350,550 | 9/1994 | Kitazawa et al. .......... 427/393.3 |
| 5,356,683 | 10/1994 | Egolf et al. ................ 427/222 |
| 5,490,631 | 2/1996 | Iioka et al. ................. 229/403 |
| 5,498,452 | 3/1996 | Powers ...................... 428/34.2 |
| 5,601,910 | 2/1997 | Murphy et al. ............. 427/393.4 |
| 5,789,453 | 8/1998 | Detterman .................. 521/92 |

*Primary Examiner*—Diana Dudash
*Attorney, Agent, or Firm*—Hoffman, Wasson & Gitler P.C.; Michael J. Doyle, Esq.

[57] ABSTRACT

A foamable thermal insulating barrier coating produced from an aqueous acrylic based latex emulsion and an unencapsulated chemical blowing agent for coating paper and paperboard and especially suitable for coating one or both sides of cupstock to retain heat and to provide moisture and grease resistance.

13 Claims, 6 Drawing Sheets

FOAMABLE INSULATING BARRIER COATING

BACKGROUND OF THE INVENTION

A sheet or film with a foam or cell structure is often used in packaging applications. However, use of a foamed structure in paper or paperboard is not well known. This invention provides an aqueous coating system that uses chemical blowing agents to create a foam structure in a final thermally insulative dry film. The foam is applied as a thermal insulating layer to one or both sides of paper cupstock.

In the plastics industry, most foam structures, those used to form coffee cups and the like, are produced via melt processing techniques such as extrusion or compression molding in which either a physical blowing agent, such as nitrogen gas, or a chemical blowing agent, such as azodicarbonamide is used.

Most single layer paper cupstock does not possess the thermal insulative properties of non-aqueous (conventional melt processable) foam structures.

Two paper cups have been combined to produce structures which approach these properties at very high cost.

It is an object of the present invention to produce a thermally insulated cupstock and cups that perform equally to or better than two paper cups used together.

It is an object of the present invention to produce a thermal insulated cupstock and cups that are cheaper than the cost of combining two paper cups.

It is also an object of the present invention to produce a coating which has good moisture resistance (moisture barrier) and excellent grease resistance (grease barrier).

SUMMARY OF THE INVENTION

A thermally insulating foamable barrier coating has been produced from an acrylic based latex emulsion and a chemical blowing agent. The thermal insulation characteristics of the insulated cups made from the paper/foam structure is better than that of a single paper cup and is comparable to that of double cups at a lower cost.

DETAILED DESCRIPTION OF THE PREFERRED EMBODIMENT

Figure 5:
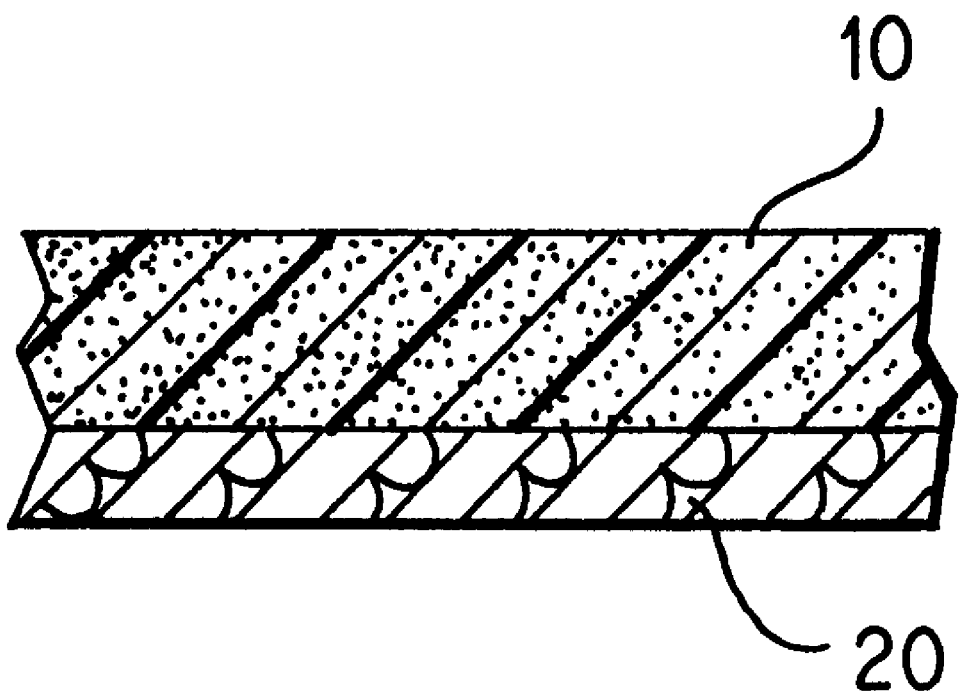
FIG. 5 is a cross-section of a laminate depicting a paper/foam structure embodying the present invention.
Figure 6:
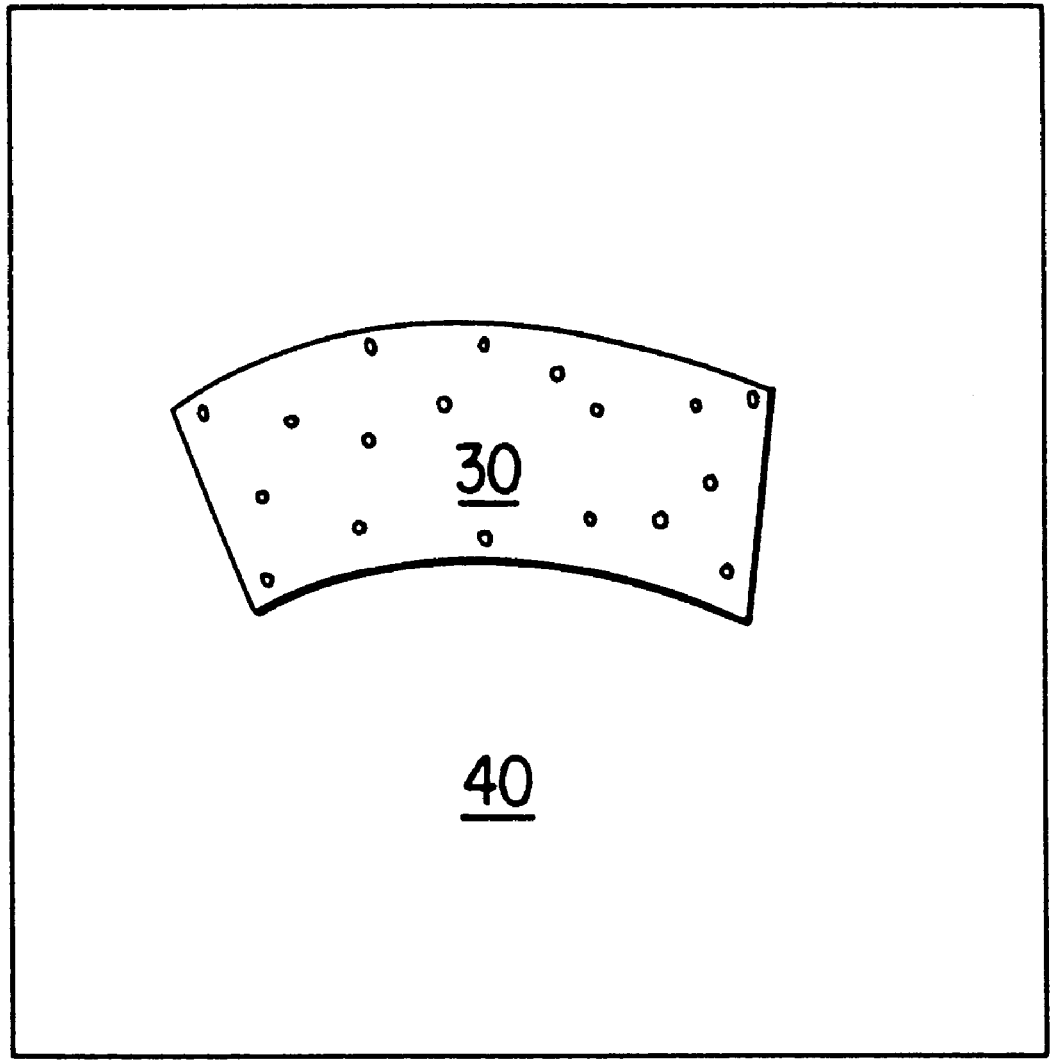
FIG. 6 is a top view of a paper/pattern foam laminate structure embodying the present invention.

FIG. 5 depicts a cross-sectional view of a paper/foam construction illustrating the aqueous foamed insulating barrier film 10 which has been coated on a paper substrate 20 by pattern coating techniques such as screen printing. Other suitable coating techniques are equally useful for producing a structure which can be assembled into a cup or the like.

An aqueous system has been developed that uses chemical blowing agents to create a foam structure in the final dry films. The coating is applied directly to paper cupstock 40 via a pattern coating technique to produce a paper/foam structure with a specified foam layer shape 30. An insulating cup is then made from this shaped paper/foam structure through the normal cup-making process.

Alternatively, the aqueous coating can be applied onto a paper substrate uniformly via conventional coating techniques such as rod coaters, roll coaters, gravure printing press, etc. The foam/paper construction can then be laminated onto a paper cup to form an insulating cup. Although for this application a pattern coating technique is used, it is not intended to restrict the use of the aqueous coating system developed only to techniques and coating methods, known to one skilled in the art, as suitable or pattern coating, but also is suitable for non-pattern coating techniques and processes as well.

Suitable aqueous latex formulations in this invention are acrylic based latex materials. The acrylic based latex materials are acrylic copolymers, such as copolymers of methyl methacrylate and butyl acrylate or copolymers of methyl methacrylate and ethyl acrylate. Sometimes these copolymers are modified by adding to the polymer chains a small fraction of polar groups such as hydroxyl groups (—OH), carboxyl groups (—COOH), or amide groups (—$CONH_2$). These polar groups can help stabilize the emulsions and may also be used as the chemical crosslinking sites with crosslinkers such as melamine formaldehyde. The two major latexes used in this work are Rhoplex P-554 (47% solid) and EXP-3182 (55.5% solid) emulsions both sold by Rohm and Haas Company of Philadelphia, Pa.

A wax emulsion is sometimes used as part of the formulation. A preferred wax emulsion is a paraffin/polyethylene wax emulsion sold by Mobil Oil Corporation of Fairfax, Va., under the trade name of Mobilcer 136 (46% solid). A particularly preferred wax emulsion is a synthetic wax emulsion available under the trade name of Nopcote DS-101 (40% solid) from Henkel Corporation of Charlotte, N.C.

Many different types of chemical blowing agents (CBAs) can be used to make foam structure in the final dry films. Sodium bicarbonate, such as the one sold under the trade name of Hydrocerol BI from B.I. Chemicals, Inc., of Montvale, N.J., has been used in the plastics industry to make foam structure in injection molding or extrusion. However, its moisture sensitivity makes it unsuitable for our latex systems. The preferred CBA for this invention is p-toluene sulfonyl hydrazide such as the one sold under the trade name of Celogen TSH by Uniroyal Chemical Company, Inc. of Middlebury, Conn. Another preferred CBA is azodicarbonamide such as the one sold under the trade name of Celogen AZ from Uniroyal Chemical Company, Inc. Yet another preferred CBA is p-toluene sulfonyl semicarbazide such as the one sold under the trade name of Celogen RA from Uniroyal Chemical Company, Inc. A particularly preferred CBA is p,p-oxybis benzene sulfonyl hydrazide such as the one sold under the trade name of Celogen OT from Uniroyal Chemical Company, Inc.

The chemical blowing agents are pre-dispersed in deionized water at a loading of from 1 to 40 wt % before being put in the latex coating formula. In order to facilitate the wet-out of these CBAs within water, a surfactant or dispersion aid is used. These surfactants can be anionic, non-ionic, or cationic, depending on the chemistry of the blowing agent and the other components in the formulation. The amount of surfactant addition may vary from 0.01% to 1% of the total weight of the dispersions.

An activator is often used in combination with the CBA to increase the decomposition rate of the CBA. It can also lower the decomposition temperature range of the CBA. The choice of an activator also depends on the type of CBA used. For instance, triethanol amine is a strong activator for p-toluene sulfonyl semicarbazide and p,p-oxybis benzene sulfonyl hydrazide, but is a weak activator for azodicarbonamide. Zinc stearate is a strong activator for azodicarbonamide but is a medium to weak activator for both p-toluene sulfonyl semicarbazide and p,p-oxybis benzene sulfonyl hydrazide. Suitable activators for the present invention include but are not limited to zinc oxide, zinc stearate, and triethanol amine. A particularly preferred one is zinc oxide which is available under the trade name of Kadox-720 from Zinc Corporation of America, Monaca, Pa. Zinc oxide is also pre-dispersed, if desired, in deionized water at 33 wt % before use.

Pigments can be added into the formulation to lower the cost of the system. Suitable pigments for this invention include calcium carbonate and clay. Clay is particularly preferred. Typically a No. 2 clay is pre-dispersed in water at 70 wt % before adding to the formulation.

Thickeners are also used, if desired, to increase the viscosity of the system. Particularly effective thickeners are cellulosic gum such as carboxyl methyl cellulose (CMC) or urethane block polymers (UBC). Thickeners selected for the examples were Acrysol RM-2020 (UBC) (20% solid from Rohm and Haas Company) and Admiral 3089FS (CMC) (39.5% solid from Aqualon Co., of Wilmington, Del.). It is found that the combination of both types of thickener usually give the best thickening effect, though the use of either thickener also proves effective.

Another additive used, if desired, is a synthetic mineral called Laponite RDS from Southern Clay Products, Inc., of Gonzales, Tex. This thixotropic additive gives dramatic thickening effects to aqueous latex systems. The Laponite RDS powder is first put in deionized water at 10 wt % loading and stirred at room temperature for 30 minutes. The solution turned clear at this point. This solution is then used as additive in the coating formulation.

When Rhoplex P-554 latex is used in the coating formulation, the resultant foam is slightly tacky. This is due to the low glass transition temperature ($T_g$) of the copolymer in P-554. This does not happen when EXP-3182 latex is used in the coating formulation because the copolymer has a higher glass transition temperature and is self crosslinkable at the processing temperatures. In order to eliminate the tackiness of the film based on Rhoplex P-554, a crosslinker is used in the coating formulation. A melamine-formaldehyde crosslinker is suitable for the present invention. The preferred melamine-formaldehyde crosslinkers are the series of resins sold under the trade name of Resimene resins from Monsanto, St. Louis, Mo. Other preferred melamine-formaldehyde crosslinkers are the series of resins sold under the trade name of Cymel resins from Cytec Industries Inc., of West Paterson, N.J. Crosslinker selected for use in the examples is Cymel 325 (80% solid) from Cytec Industries Inc.

The composition range for the coating formulation (based on dry weight) is: Acrylic copolymer 60–95 wt %; chemical blowing agents 1–25 wt %; wax 0–15 wt %; clay 0–20 wt %; melamine crosslinker 0–15 wt %; thickener 1 (CMC) 0.1–5 wt % and thickener 2 (UBC) 0.1–5 wt %; and activator 0–25 wt %. When the thixotropic additive thickener is used it ranges from 0.1–5.0 wt %.

The latex coating is prepared in a stainless steel vessel with a Cowles mixer propelled by an air motor. The viscosity of the coating is measured with a Brookfield RV model viscometer at a speed of 50 rpm. The coating is formed on 14 point solid bleached sulfate board or SBS. The coating is applied uniformly via a Gardener's knife (or Doctor's blade). The wet coating/paper substrate is then put in a Blue M oven set at various temperatures for drying and foaming.

The theoretical unblown coating thickness is calculated by multiplying the clearance of the Gardener's knife by the solid content of the coating formula. The actual unblown film thickness is obtained by measuring the film that is dried at a low temperature (70–90° C.). At this low temperature range the chemical blowing agents do not decompose. It turned out that in most cases the theoretical and the actual unblown film thickness is very close. The final thickness of the blown film is measured with a caliper. The blow ratio (BR) is defined by the ratio of the final blown film thickness to the actual unblown film thickness.

The foam is then cut into specified shape and dimension and for example purposes only taped onto 16 oz. paper cups in the form of a sleeve. Temperature measurements are done using a digital thermometer interfaced with a personal computer (PC) for data acquisition. Two type K thermocouples with a time constant of less than 0.4 seconds are used simultaneously to measure the temperature of the outside surface of the cup and the inside hot coffee, respectively. The data is collected by the PC at an interval of 2 seconds.

The following examples are illustrative of aqueous coatings embodying the present invention. They are not limiting in scope, but merely representative. Although most of the examples cover coating on one side only, usually the exterior, it is intended that similar coatings could and would be applied on both or only the interior side of the paperboard, depending on the needs of the particular application and the marketplace.

EXAMPLES

Example 1

The following coating formula was prepared:

| MATERIAL | WEIGHT, g |
| --- | --- |
| Rhoplex P-554 | 100 |
| Nopcote DS-101 | 10 |
| CBA (Celogen OT) | 10 |
| Acrysol RM-2020 | 9 |

This viscosity of this formulation was 700 cps. A coating was cast on 14 point SBS using the Gardener's knife with a clearance of 0.04" (40 mils). The coating was dried and foamed at 150° C. for four minutes. The blow ratio of the dry film was 1.3. The film was slightly tacky.

Example 2

Another coating formula was prepared:

| MATERIAL | WEIGHT, g |
| --- | --- |
| Rhoplex P-554 | 100 |
| Nopcote DS-101 | 10 |
| No. 2 clay | 10 |
| CBA (Celogen OT) | 10 |
| Admiral 3089FS | 1.5 |
| Acrysol RM-2020 | 1.5 |

The viscosity of this formulation was 3,800 cps. A coating was cast on the same substrate using a Gardener's knife with a clearance of 0.04". The coating was dried and foamed at 150° C. for four minutes. The dry film had a BR of 1.3. The dry film surface was not as tacky as the sample from Example 1 because of the clay addition. It can be seen that the combination of both types of thickeners (e.g., Admiral 3089FS and Acrysol RM-2020) gave synergistic thickening effect.

Example 3

Another coating formula was prepared:

| MATERIAL | WEIGHT, g |
| --- | --- |
| Rhoplex P-554 | 100 |
| Nopcote DS-101 | 10 |
| NO. 2 clay | 10 |
| Cymel 325 | 4 |
| CBA (Celogen OT) | 10 |
| Admiral 3089FS | 1.5 |
| Acrysol RM-2020 | 1.5 |

The viscosity of this formulation was 1,080 cps. A coating was cast on the same substrate using a Gardener's knife with a clearance of 0.04". The coating was dried and foamed at 150° C. for four minutes. The dry film had a BR of 1.6. The dry film surface was even less tacky than the sample from Example 2 as a result of the cross linking reaction by Cymel 325. It should be mentioned that the viscosity was lower than the coating formula in Example 2. It was attributed to the dilution effect of water. Since Cymel 325 was a very viscous liquid, 10 grams of deionized water was added to help dispense the amount of cross linker (4 grams) from the beaker.

Example 4

Another coating formula was prepared:

| MATERIAL | WEIGHT, g |
| --- | --- |
| Rhoplex P-554 | 100 |
| Nopcote DS-101 | 10 |
| No. 2 clay | 10 |
| Cymel 325 | 4 |
| CBA (Celogen OT) | 12 |
| Admiral 3089FS | 1.7 |
| Acrysol RM-2020 | 1.7 |

The viscosity of this formulation was 2,000 cps. A coating was cast on the same substrate using a Gardener's knife with a clearance of 0.04". The coating was dried and foamed at 150° C. for four minutes. The dry film had a BR of 1.7. The difference between this formula and Example 3 was the amount of CBA and thickeners used here were slightly increased. However, there was little effect on the blow ratio of the dry film.

Example 5

Another coating formula was prepared:

| MATERIAL | WEIGHT, g |
| --- | --- |
| Rhoplex P-554 | 100 |
| No. 2 clay | 10 |
| Cymel 325 | 4 |
| CBA (Celogen OT) | 12 |
| Admiral 3089FS | 1.7 |
| Acrysol RM-2020 | 1.7 |

This viscosity of this formulation was 3,500 cps. A coating was cast on the same substrate using a Gardener's knife with a clearance of 0.04". The coating was dried and foamed at 150° C. for four minutes. The dry film had a BR of 1.5. In this formula, the wax emulsion was not added in the coating formula. It appeared to have little effect on the blow ratio of the system.

Example 6

Another coating formula was prepared:

| MATERIAL | WEIGHT, g |
| --- | --- |
| Rhoplex P-554 | 100 |
| Nopcote DS-101 | 10 |
| Zinc oxide | 12 |
| CBA (Celogen OT) | 12 |
| Admiral 3089FS | 1.7 |
| Acrysol RM-2020 | 1.7 |

The viscosity of this formulation was 1,600 cps. A coating was cast on the same substrate using a Gardener's knife with a clearance of 0.04". The coating was dried and foamed at 150° C. for four minutes. The dry film had a BR of 2.2. It can be seen that the use of ZnO can promote the decomposition reaction of the CBA and help improve the blow ratio.

Another film was cast using the Gardener's knife with a clearance of 0.025". The coating was dried and foamed at 150° C. for four minutes. The dry film had a BR of 1.8. This demonstrated the effect of wet coating web thickness on the final structure of the film.

Another film was cast using the Gardener's knife with a clearance of 0.025". The coating was first dried at 85° C. for 10 minutes. At this stage, the CBA decomposition had not occurred yet. A final heat treatment by exposing the coating at 150° C. for additional four minutes. The final film had a BR of 1.6. It appeared that the two stage drying/foaming did not offer any advantages over the single stage drying/foaming.

Example 7

Another coating formula was prepared:

| MATERIAL | WEIGHT, g |
| --- | --- |
| Rhoplex P-554 | 100 |
| Nopcote DS-101 | 10 |
| Zinc oxide | 12 |
| Admiral 3089FS | 1.7 |
| Acrysol RM-2020 | 1.1 |

The viscosity of this formulation was 1,700 cps. A side-by-side coating draw-down of coating formula 6 and 7 was cast on the same substrate using a Gardener's knife with a clearance of 0.025". The coating was dried and foamed at 160° C. for four minutes. The dry film of coating formula 7 appeared very smooth without any expansion or foaming whereas the dry film of coating formula 6 was rough with a blow ratio of about 1.8.

Example 8

A coating based on the following formula was prepared:

| MATERIAL | WEIGHT, g |
|---|---|
| EXP-3182 | 100 |
| Nopcote DS-101 | 10 |
| CBA (Celogen OT) | 12 |
| Acrysol RM-2020 | 1.2 |

The viscosity of this formulation was 800 cps. A coating was cast on the 14 point SBS using a Gardener's knife with a clearance of 0.04". The coating was dried and foamed at 150° C. for four minutes. The dry film had a BR of 2.1.

Example 9

Another coating formula was prepared:

| MATERIAL | WEIGHT, g |
|---|---|
| EXP-3182 | 100 |
| Nopcote DS-101 | 10 |
| CBA (Celogen OT) | 12 |
| Admiral 3089FS | 1.6 |
| Acrysol RM-2020 | 0.9 |

The viscosity of this formulation was 5,300 cps. A coating was cast on the same substrate using a Gardener's knife with a clearance of 0.025". The coating was subjected to two stage drying/foaming. First it was dried at 90° C. for 10 minutes then foamed at 170° C. for four minutes. The dry film had a BR of 2.8.

Another coating was made with a clearance of 0.02". It was also subjected to the two stage process. The dry film had a BR of 2.5. Again we observe the effect of wet film web thickness on the final film thickness.

Example 10

Another coating formula was prepared:

| MATERIAL | WEIGHT, g |
|---|---|
| EXP-3182 | 100 |
| Nopcote DS-101 | 10 |
| Zinc oxide | 12 |
| CBA (Celogen OT) | 12 |
| Admiral 3089FS | 1.7 |
| Acrysol RM-2020 | 1.7 |

The viscosity of this formulation was 4,800 cps. A coating was cast on the same substrate using a Gardener's knife with a clearance of 0.025". The coating was subjected to two stage drying/foaming. First it was dried at 85° C. for 10 minutes then a foamed at 160° C. for four minutes. The dry film had a BR of 3.0.

Another film was made with a clearance of 0.015". The same two stage drying/foaming process was employed. The dry film had a BR of 2.7. The same trend as we observed in the previous examples (e.g., Example 6) is seen here. Zinc oxide appeared to improve the BR of the film.

Example 11

Another coating formula was prepared:

| MATERIAL | WEIGHT, g |
|---|---|
| EXP-3182 | 100 |
| Nopcote DS-101 | 10 |
| CBA (Celogen OT) | 33 |
| Admiral 3089FS | 2.2 |
| Acrysol RM-2020 | 0.8 |

The viscosity of this formulation was 4,800 cps. A coating was cast on the same substrate using a Gardener's knife with a clearance of 0.02". It was then dried and foamed at 170° C. for four minutes. The dry film had a BR of 3.3. Comparing the result here with that shown in Example 9 (where the BR of the dry film cast from 0.02" wet web thickness was 2.5), the effect of increasing the CBA content is demonstrated.

Example 12

Another coating formula was prepared:

| MATERIAL | WEIGHT, g |
|---|---|
| EXP-3182 | 100 |
| Nopcote DS-101 | 10 |
| CBA (Celogen OT) | 12 |
| Laponite RDS | 8.5 |

The viscosity of this formulation was 2,200 cps. A coating was cast on the same substrate using a Gardener's knife with a clearance of 0.02". It was then dried and foamed at 160° C. for four minutes. The dry film had a BR of 3.5. Comparing the result here with that shown in Example 9 (where the BR of the dry film cast from 0.02" wet web thickness was 2.5), the effect of using Laponite as thixotropic additive is obvious.

The coating was also evaluated by a pattern coating technique, i.e., spray coating. A laboratory set-up with a spray nozzle was used. It was connected to a house compressed air with a pressure of about 40 psi. The spraying experiment was performed on this coating formula. It turned out that this coating was very sprayable. The wet coating did not sag on a vertically placed SBS substrate even when the web thickness built up. It was attributed to the thixotropic nature of the coating formula. The coating was then dried and foamed at 160° C. for four minutes.

Example 13

Another coating formula was prepared:

| MATERIAL | WEIGHT, g |
|---|---|
| EXP-3182 | 100 |
| Nopcote DS-101 | 10 |
| Zinc oxide | 15 |
| CBA (Celogen AZ) | 12 |
| Admiral 3089FS | 1.6 |
| Acrysol RM-2020 | 1.5 |

The viscosity of this formulation was 3,000 cps. A different type of CBA (Celogen AZ) was used. A coating was cast on the same substrate using a Gardener's knife with a clearance of 0.02". It was then dried and foamed at 170° C. for four minutes. The dry film had a BR of 2.2.

Example 14

Another coating formula was prepared:

| MATERIAL | WEIGHT, g |
|---|---|
| EXP-3182 | 100 |
| Nopcote DS-101 | 10 |
| CBA (Hydrocerol BIF) | 12 |
| Admiral 3089FS | 1.6 |
| Acrysol RM-2020 | 0.9 |

The latex was unstable as Hydrocerol BIF was added. The viscosity was rather high. There were gel-like particles in the latex. A coating was cast on the same substrate using a Gardener's knife with a clearance of 0.02". It was then dried and foamed at 160° C. for four minutes. The dry film had a BR of 1.3.

Example 15

In order to make a comparison between un-foamed film (a coating formula that does not contain CBA) and the foamed samples, the following sample was prepared:

| MATERIAL | WEIGHT, g |
|---|---|
| Rhoplex P-554 | 100 |
| Nopcote DS-101 | 10 |
| No. 2 clay | 10 |
| Cymel 325 | 4 |
| Admiral 3089FS | 1.5 |
| Acrysol RM-2020 | 1.5 |

The viscosity of this formulation was 1,200 cps. A coating was cast on the same substrate using a Gardener's knife with a clearance of 0.04". It was then dried at 150° C. for five minutes. The dry film had a thickness of 0.013" (13 mils).

The tests for these films include grease resistance (3M kit test), moisture absorption (5" Cobb test), and water vapor transmission rate test or WVTR (ASTM E-96). The WVTR was measured under 50% RH and 73° F. All the samples chosen were cast from the Gardener's knife with a clearance of 0.04". However, the final thickness of the dry film varied a lot due to the difference in BR. The paper substrate was attached to the film during the measurements. The thickness of the film reported here did not include the paper substrate thickness. Table 1 lists the test results.

| Sample ID | Thickness, mils | 3M Kit Test | Cobb Test (g/m$^2$) | WVTR (g/100 in$^2$-day) |
|---|---|---|---|---|
| Paper Substrate | 14 | 3 | 137 | 6.1 |
| Example 15 | 13 | 12 | 11.9 | 1.7 |
| Example 4 | 22 | 12 | 26.4 | 2.5 |
| Example 5 | 20 | 12 | 17.3 | 3 |
| Example 8 | 40 | 12 | 46.1 | 1.4 |

The sample from Example 15 did not have the foam structure (a solid film) and was based on Rhoplex P-554 latex. Both the samples from Examples 4 and 5 had the foam structure and were based on Rhoplex P-554. However, the sample from Example 5 did not contain any wax. As for the sample from Example 8, it was a foam based on EXP-3182 emulsion and contained wax. It is seen that these coatings make the paper substrate a lot more resistant to grease as can be evidenced from the 3M kit test results. All of these coatings improve the water and moisture resistance of the paper substrate based on both Cobb test and WVTR.

As for the difference between a solid film (Example 15) and a foam (Examples 4 and 5) of the same resin, it appeared that the foam structure was more permeable to water vapor moisture than the solid film, as can be seen from the Cobb test and WVTR results.

The desired application is to use these foamable coatings on cup stock and make insulated cups. An insulated cup is produced that performs equally to or better than two paper cups used together is the result. The price of the insulated cup is less than that of two paper cups.

A foamed film was attached and secured to the paper cups by using adhesive tape for experimental purposes. It was very tightly taped onto the paper cup to ensure that there was no air gap between the foam and paper cup. Freshly brewed coffee was poured into the cup and the temperature of the hot coffee inside the cup as well as the temperature of the outside cup surface were measured simultaneously at the same frequency of one per every two seconds. A thermocouple probe in the form of a thin leaf was used. Therefore, it was possible to get good contact with the outside cup surface and obtain accurate temperature readings.

The insulated cups from two foamed sheets were evaluated. A first sample was based on the formula given in Example 4 (based on Rhoplex P-554). The coating was obtained by casting on the substrate using a Gardener's knife with a 0.07" clearance and subsequently foamed at 150° C. for 10 minutes. The dry film thickness was 0.055". The BR was 1.8. The second sample was based on the formula given in Example 9 (based on EXP-3182 emulsion). The coating was cast using a Gardener's knife with a clearance of 0.025". It was foamed at 170° C. for four minutes. The dry film thickness was 0.034". The BR was 2.8.

Figure 1:
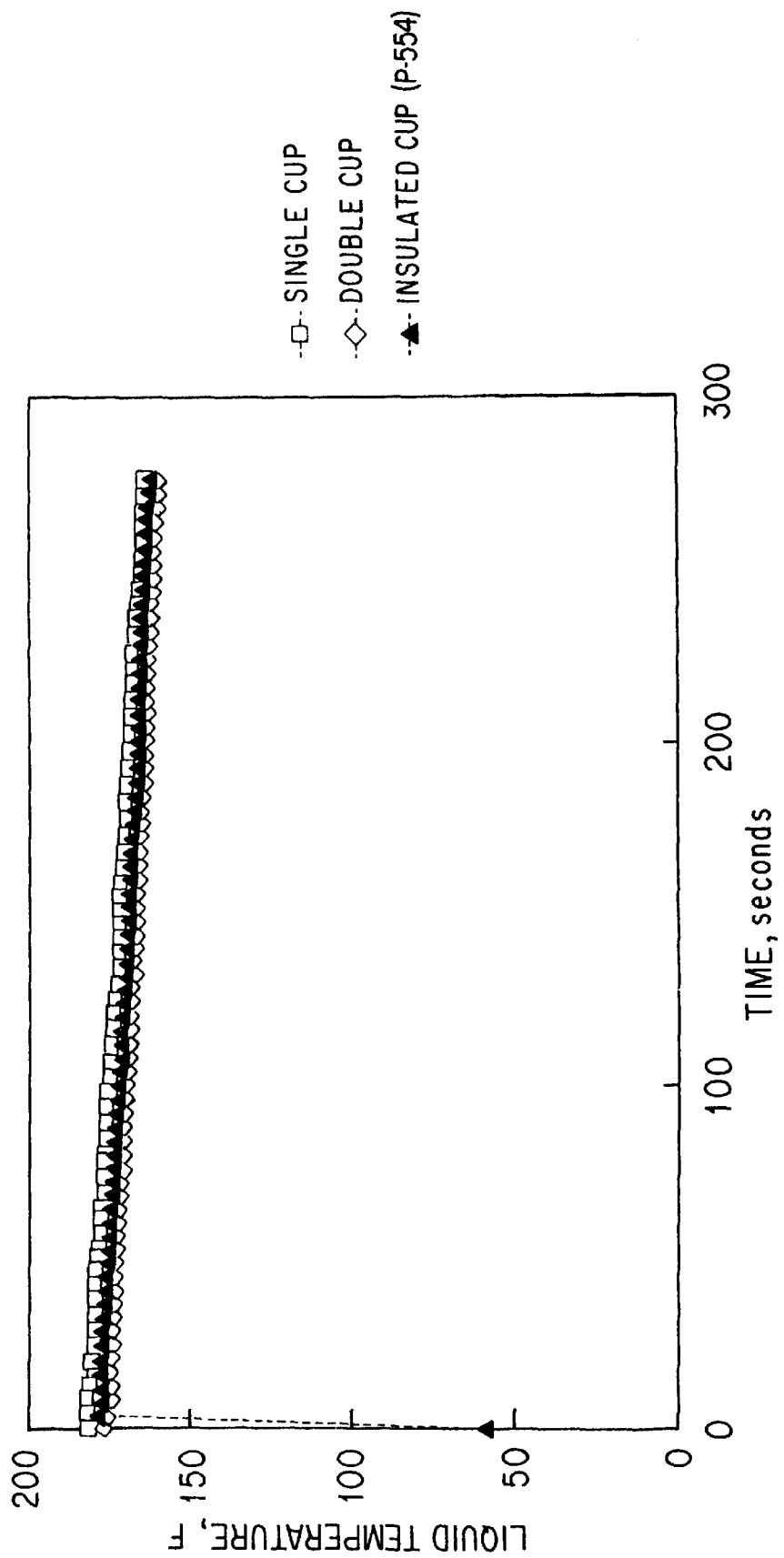
FIG. 1 is a graphical representation of inside coffee temperatures as a function of time for a single cup, double cup and a cup embodied by the present invention.

FIG. 1 shows the temperatures of the hot coffee inside the cup as a function of time for the first five minutes or so. The results for a single cup, double cup, and the insulated cup (based on Rhoplex P-554) are shown. The freshly brewed hot coffee typically had a temperature of 180–190° F. It can be seen that the temperatures of the hot coffee inside all three cups decreased slowly with time. The difference between them was very small.

Figure 2:
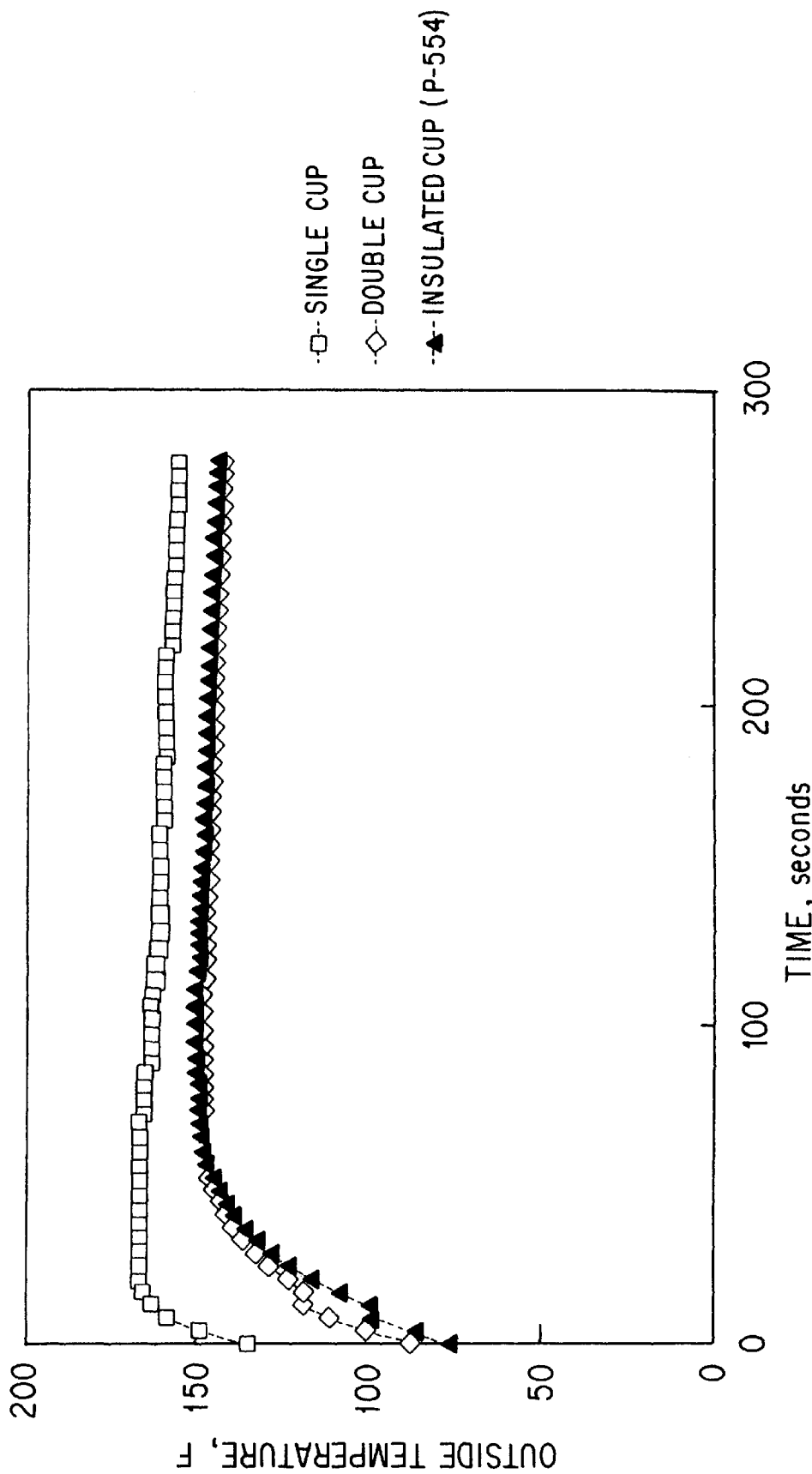
FIG. 2 is a graphical representation of outside surface temperatures as a function of time for a single cup, double cup and a cup embodied by the present invention.

FIG. 2 shows the temperatures of the outside surfaces of these three cups as a function of time. One can see the instant rise in outside surface temperatures as hot coffee was poured into the cups. However, the temperature rise for both the double cup and insulated cup proceeded at a much slower rate than the single cup control. The difference in temperature rise between the double cup and the insulated cup was very small except in the first one minute or so. At this time interval the outside surface temperature of the insulated cup was slightly lower than that of the double cup.

Figure 3:
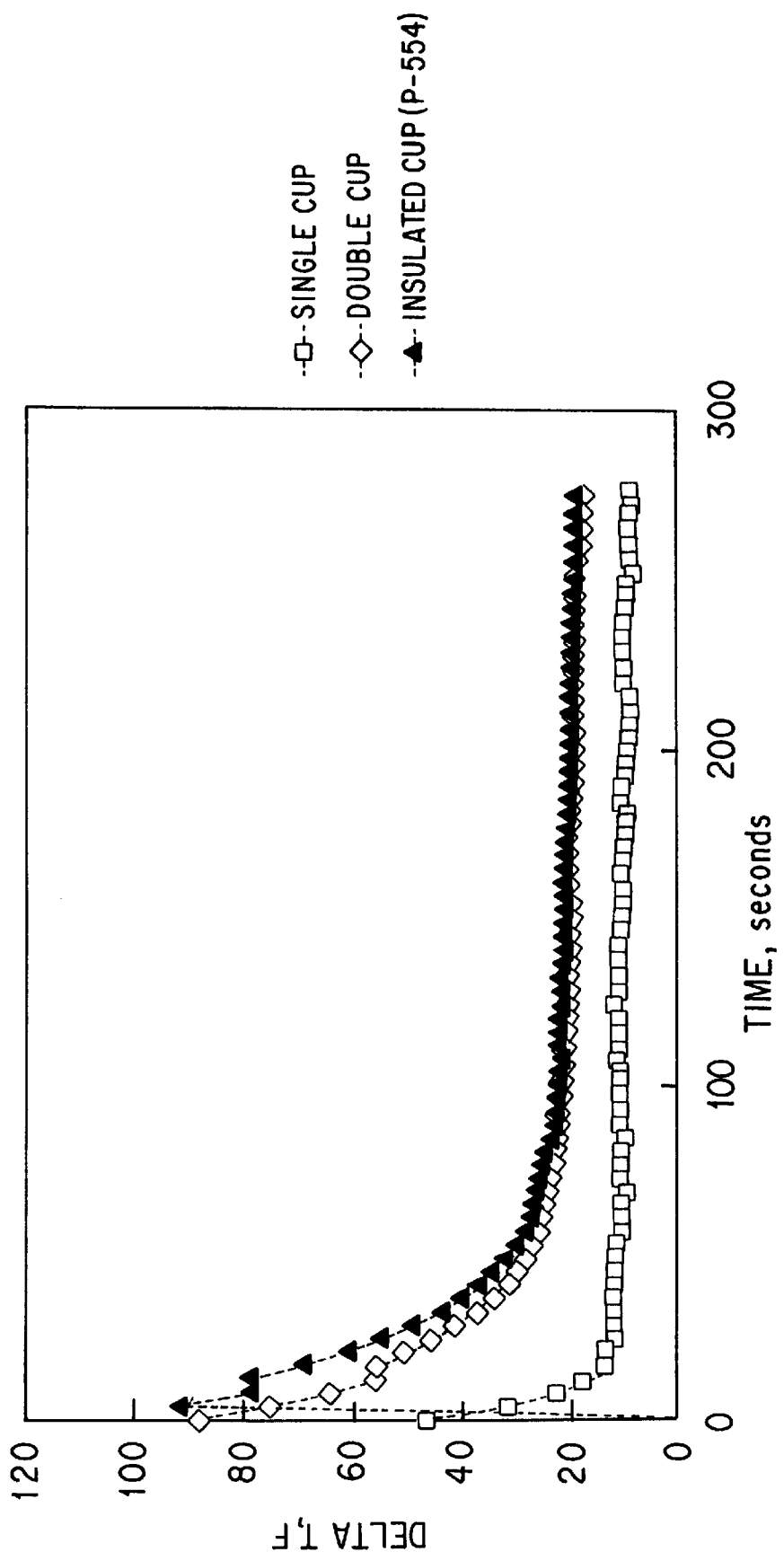
FIG. 3 is a graphical representation of the temperature difference between the inside coffee temperatures and the outside surface temperatures as a function of time for a single cup, double cup and a cup embodied by the present invention.

FIG. 3 shows the temperature difference (Delta T) between the inside hot coffee and the outside surface for the three cups tested. The larger the Delta T is, the better the insulation of the cup is. One can see that Delta T is not constant at all times, but it became somewhat unchanged after 1–2 minutes. The Delta T became a steady number of 20–22° F. after 2–3 minutes for both the double cup and the insulated cup. The Delta T for the single cup became a steady number of about 9–11° F. after only 0.5 to one minute.

Figure 4:
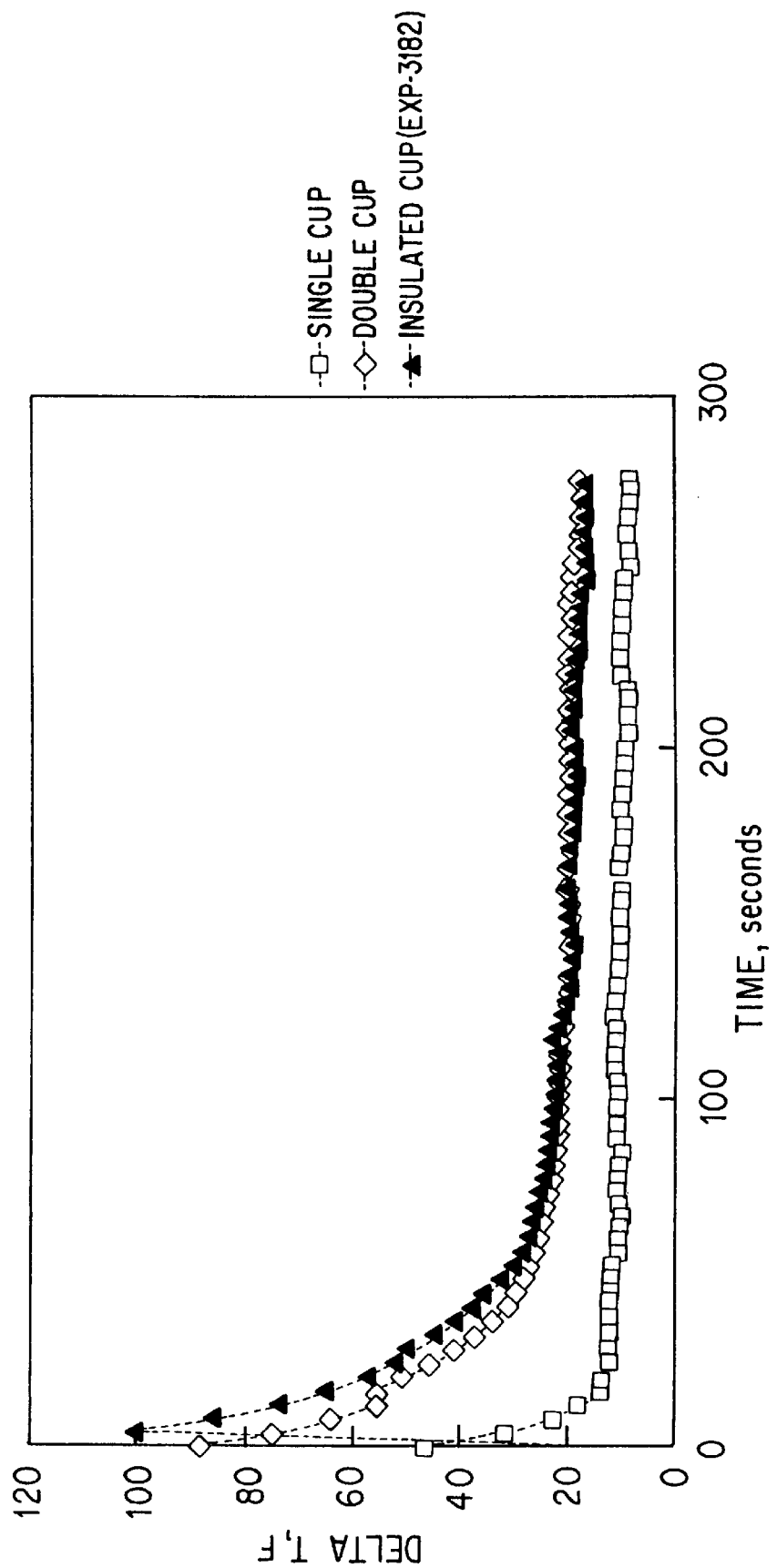
FIG. 4 is a graphical representation of the temperature difference between the inside coffee temperatures and the outside surface temperatures as a function of time for a single cup, double cup and a cup embodied by the present invention.

FIG. 4 shows the Delta T for the other insulated cup (based on EXP-3182 emulsion) along with the data for single cup and double cup, too. The Delta T for this insulated cup also became a steady number of 19–21° F. after 2–3 minutes. Therefore, the performances of both types of insulated cups are similar to each other. Their insulating characteristics is also similar to that of a double cup, but better than that of a single cup.

Chemical blowing agents (CBAs) have been successfully formulated in latex or aqueous polymer solution to make an unique foam structure.

The thermal insulation characteristics of the insulated cups made from either acrylic latex system is better than that of a single paper cup and is comparable to that of double paper cups.

The insulated paper laminate structure is also suitable for other types of food packaging applications such as clam shells, sandwich containers, food trays or other application which desires thermal insulation properties for a structure.

In all situations, the insulating coating acts as a thermal, grease and moisture barrier for the substrate.

What is claimed is:

1. A thermal insulating barrier coating for use on an interior and/or an exterior of a paper substrate comprising:
   a) an aqueous acrylic based latex emulsion; and
   b) a non-encapsulated chemical blowing agent selected from the group consisting of azodicarbonamide, pip-oxybis benzene sulfonyl hydrazide, and p-toluene sulfonyl hydrazide, wherein said barrier coating is foamable and provides thermal, grease and moisture barrier properties.

2. A thermal insulating barrier coating for use on the interior and/or exterior of a paper substrate in accordance with claim 1, further comprising an activator to enhance the foaming process.

3. A thermal insulating barrier coating for use on the interior and/or exterior of a paper substrate in accordance with claim 1, further comprising a wax emulsion.

4. A thermal insulating barrier coating for use on the interior and/or exterior of a paper substrate in accordance with claim 1, further comprising a thickener compound.

5. A thermal insulating barrier coating for use on the interior and/or exterior of a paper substrate in accordance with claim 1, wherein said acrylic based latex emulsion is a copolymer of methyl methacrylate and butyl acrylate or a copolymer of methyl methacrylate and ethyl acrylate.

6. A thermal insulating barrier coating for use on the interior and/or exterior of a paper substrate in accordance with claim 2, wherein said activator is zinc oxide.

7. A thermal insulating barrier coating for use on the interior and/or exterior of a paper substrate in accordance with claim 4, wherein said thickener is cellulosic gum, urethane block copolymer, a synthetic clay mineral or combinations thereof.

8. A foamable thermal insulating barrier coating for use on an interior and/or an exterior of paper cupstock comprising:
   a. from 60–95 wt % aqueous acrylic based latex emulsion;
   b. from 1–25 wt % non-encapsulated chemical blowing agent selected from the group consisting of azodicarbonamide, pip-oxybis benzene sulfonyl hydrazide, and p-toluene sulfonyl hydrazide; and
   c. from 0.1–5 wt % thickener compound, wherein said barrier coating provides, thermal, grease and moisture barrier properties.

9. A foamable thermal insulating barrier coating for use on the interior and/or exterior of paper cupstock in accordance with claim 8, further comprising a wax emulsion.

10. A foamable thermal insulating barrier coating for use on the interior and/or exterior of paper cupstock in accordance with claim 8, further comprising an activator to enhance the foaming process.

11. A thermal insulating barrier coating for use on the interior and/or exterior of a paper substrate in accordance with claim 8, wherein said acrylic based latex emulsion is a copolymer of methyl methacrylate and butyl, acrylate or a copolymer of methyl methacrylate and ethyl acrylate.

12. A thermal insulating barrier coating for use on the interior and/or exterior of a paper substrate in accordance with claim 10, wherein said activator is zinc oxide.

13. A thermal insulating barrier coating for use on the interior and/or exterior of a paper substrate in accordance with claim 8, wherein said thickener is cellulosic gum, urethane block copolymer, a synthetic clay mineral or combinations thereof.

* * * * *